A. J. LARCHER.
FORGING PROCESS AND APPARATUS.
APPLICATION FILED DEC. 27, 1920.
1,403,696.
Patented Jan. 17, 1922.
8 SHEETS—SHEET 1.
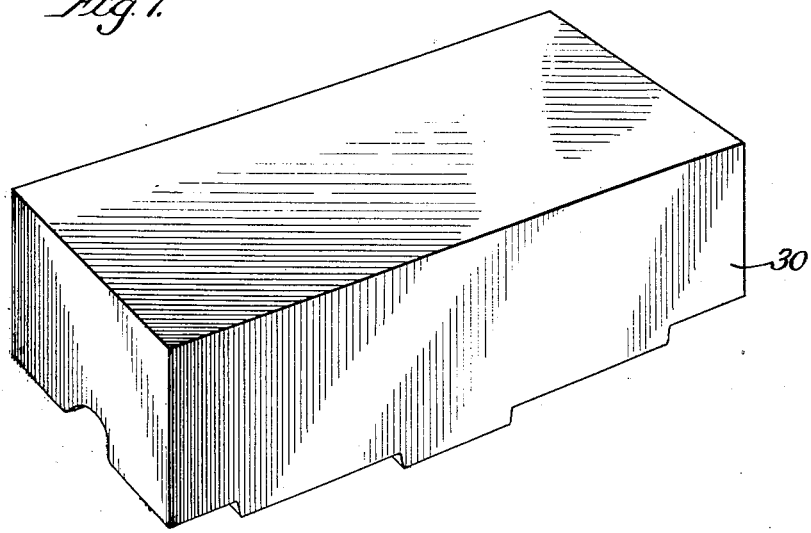
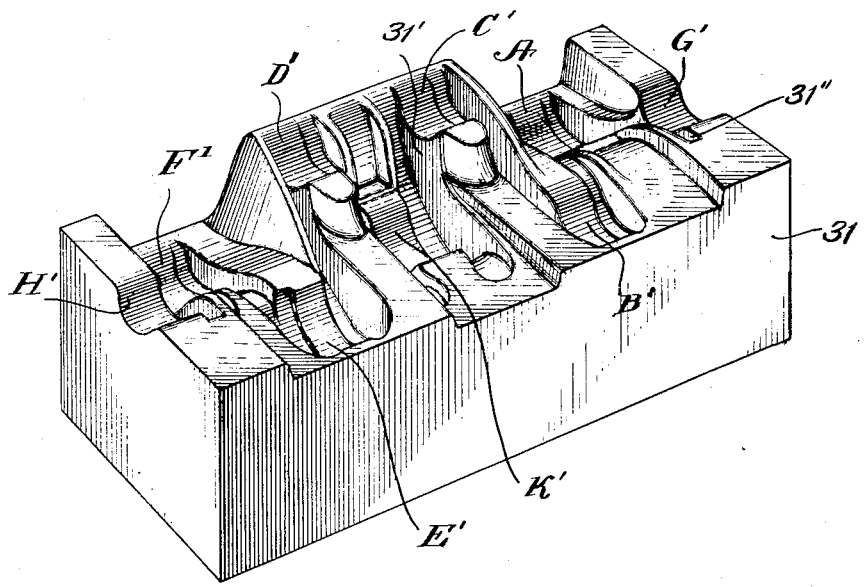

A. J. LARCHER.
FORGING PROCESS AND APPARATUS.
APPLICATION FILED DEC. 27, 1920.
1,403,696.
Patented Jan. 17, 1922.
8 SHEETS—SHEET 2.
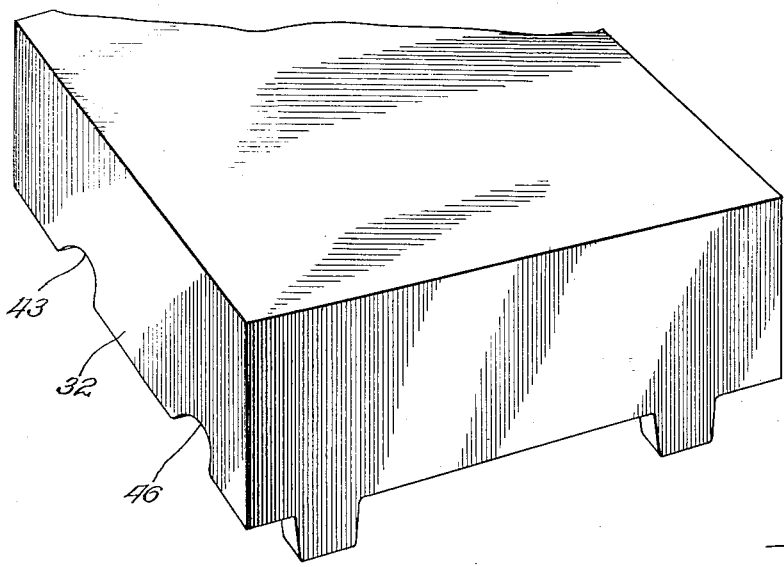
Fig. 2.
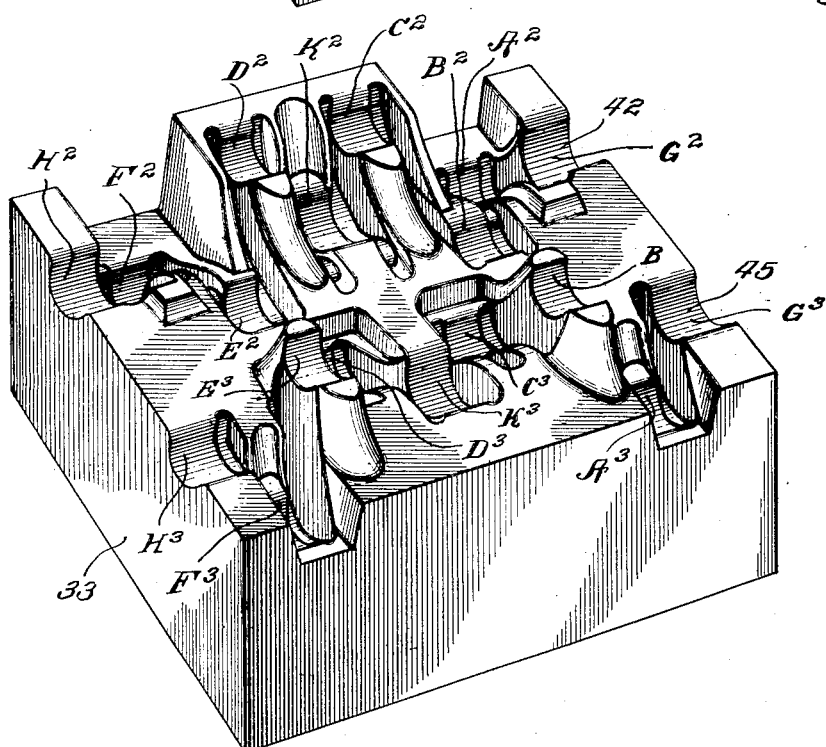
Inventor:
Albert J. Larcher.
By Fisher, Dowl, Clapp & Soans
Attys.

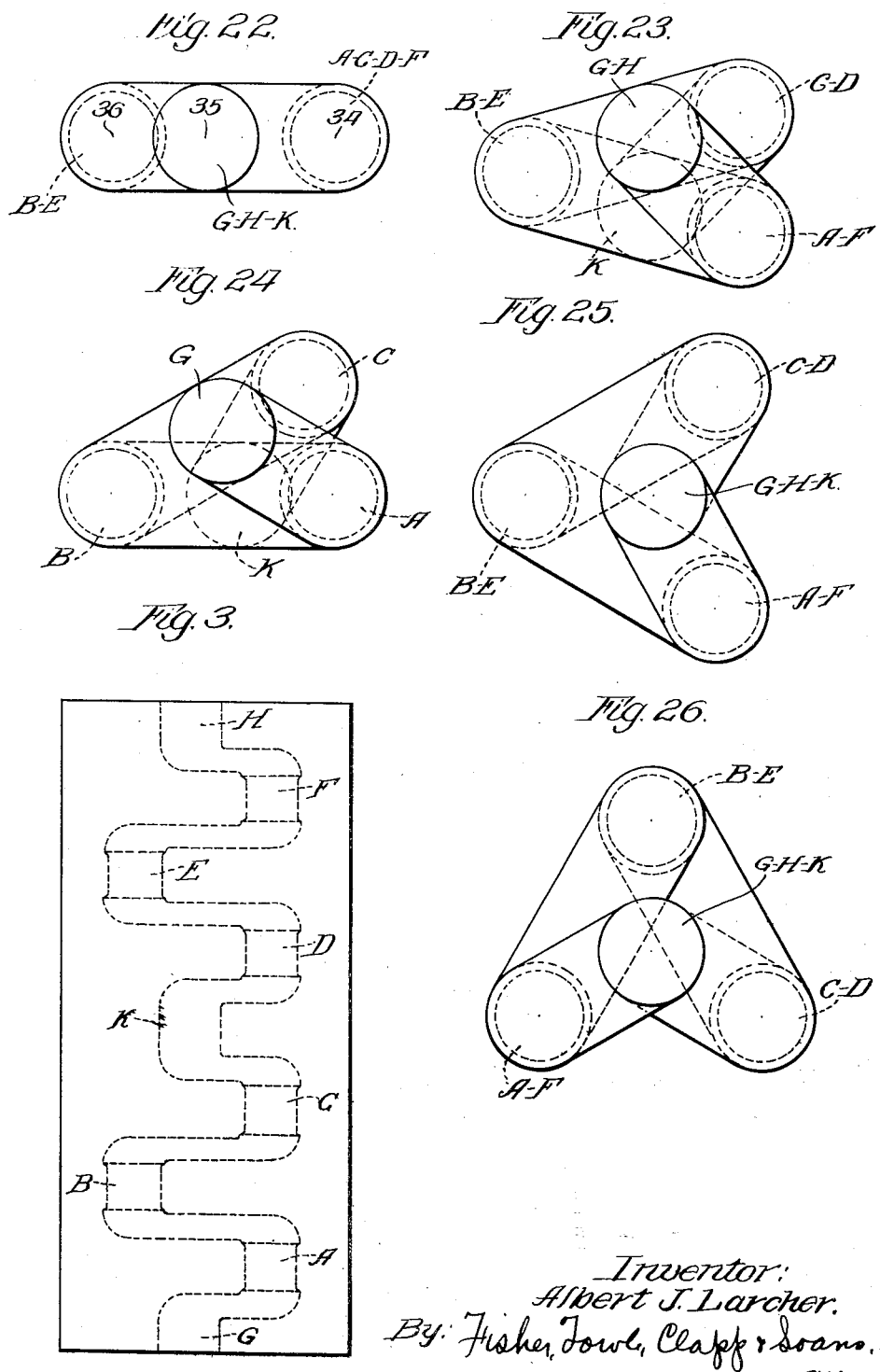

A. J. LARCHER.
FORGING PROCESS AND APPARATUS.
APPLICATION FILED DEC. 27, 1920.

1,403,696.

Patented Jan. 17, 1922.

Inventor:
Albert J. Larcher.
By: Fisher, Towle, Clapp & Soans
Attys.

A. J. LARCHER.
FORGING PROCESS AND APPARATUS.
APPLICATION FILED DEC. 27, 1920.

1,403,696.

Patented Jan. 17, 1922.
8 SHEETS—SHEET 6.

Inventor:
Albert J. Larcher.
By: Fisher, Fowle, Clapp & Soans,
Attys.

A. J. LARCHER.
FORGING PROCESS AND APPARATUS.
APPLICATION FILED DEC. 27, 1920.

1,403,696.

Patented Jan. 17, 1922.
8 SHEETS—SHEET 7.

Inventor:
Albert J. Larcher.
By Fisher, Towle, Clapp & Soans
Attys.

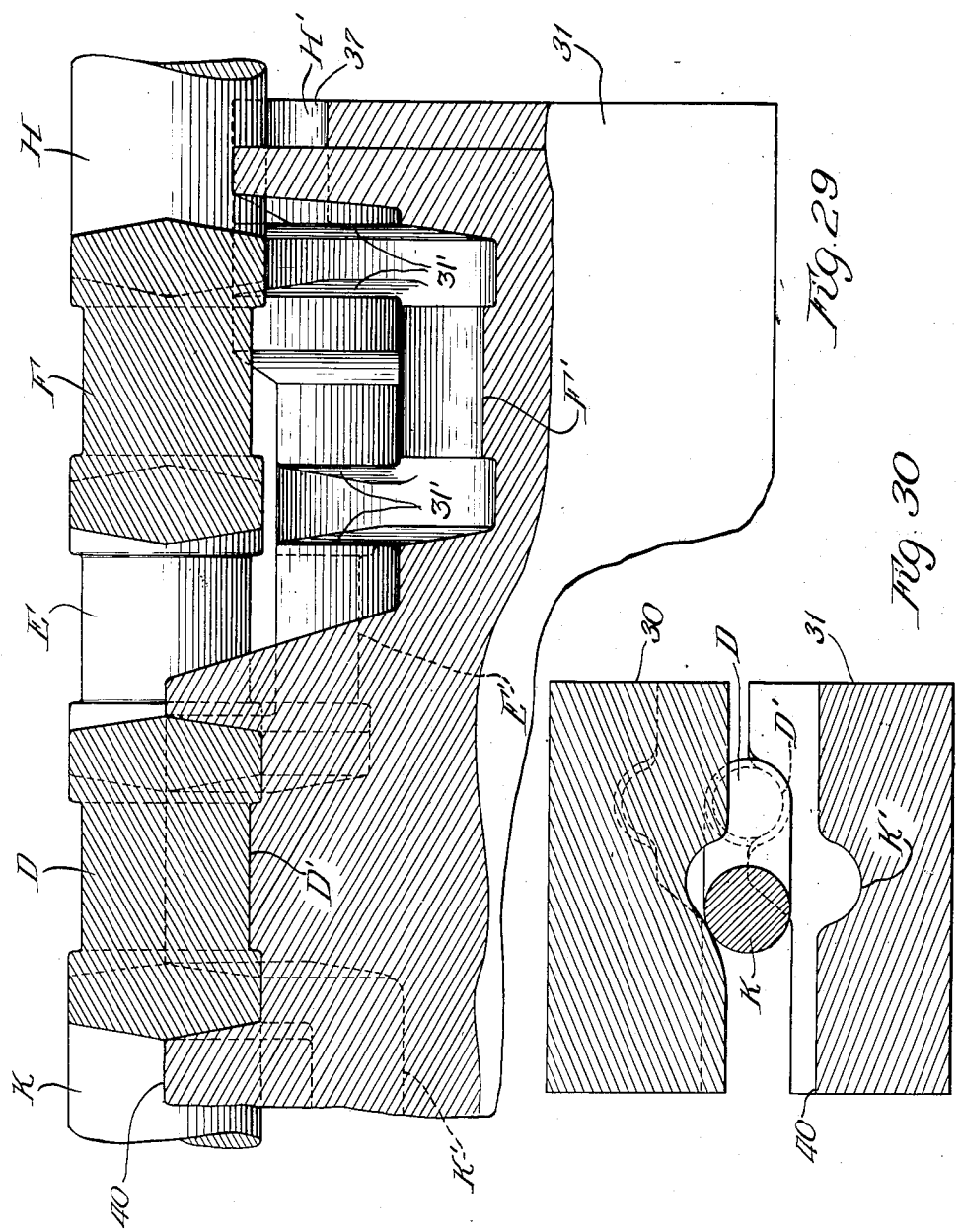

UNITED STATES PATENT OFFICE.

ALBERT J. LARCHER, OF HARVEY, ILLINOIS, ASSIGNOR TO WYMAN-GORDON COMPANY, OF WORCESTER, MASSACHUSETTS, A CORPORATION OF MASSACHUSETTS.

FORGING PROCESS AND APPARATUS.

1,403,696.          Specification of Letters Patent.     Patented Jan. 17, 1922.

Application filed December 27, 1920. Serial No. 433,216.

*To all whom it may concern:*

Be it known that I, ALBERT J. LARCHER, a citizen of the United States, residing at Harvey, in the county of Cook and State of Illinois, have invented certain new and useful Improvements in Forging Processes and Apparatus, of which the following is a specification.

This invention relates to metal forging but more particularly to the forging of multiple throw crank shafts for engines.

The primary object of the invention is to provide a simplified and improved forging process and apparatus which will produce a superior crank shaft.

Further objects of the invention are to provide improved indexing, centering and spacing, to procure by the forging process true cylindrical crank pins and bearings, to remove the flash line from the pins and bearings, to facilitate machining, to eliminate locking of the dies necessary in forging in position, to eliminate the use of wrenches or twisting arms in the twisting operation, to eliminate cooling and subsequent reheating to permit truing of the bearings, to eliminate stretching, to simplify the trimming operation, to provide support for all cheeks during the twisting operation, to secure uniformity and balance in the forged crank shaft, and to twist the various pins and bearings into proper relation by forging.

The many other objects and advantages of the invention will be better understood by reference to the following specification when considered in connection with the accompanying drawings illustrating a selected embodiment thereof, in which—

Fig. 1 is a perspective view of the preliminary twisting dies;

Fig. 2 is a perspective view of the final twisting and setting dies;

Fig. 3 is a plan view of the forming dies;

Fig. 22 is an end elevation of the crank shaft blank at the completion of the forming operation;

Fig. 23 is an end elevation of the crank shaft blank at the completion of the preliminary twist;

Fig. 24 is the same as Fig. 23 with the blank positioned for the start of the final twist;

Fig. 25 is an end elevation of the crank shaft at the completion of the final twist; and Fig. 26 is the same as Fig. 25 but with the crank shaft positioned for the start of the setting operation.

Fig. 29 is a section on the line 29—29 of Fig. 4.

Fig. 30 is the same as Fig. 10 except that the parts are in the position of initial engagement by the upper die.

Figure 7:
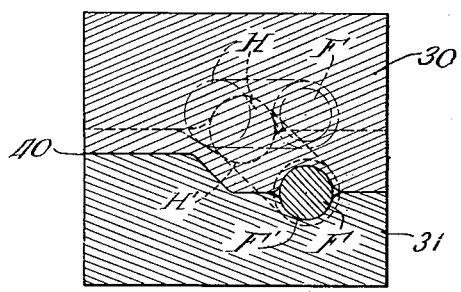
Fig. 7 is a section on the line 7—7 of Fig. 4.
Figure 8:
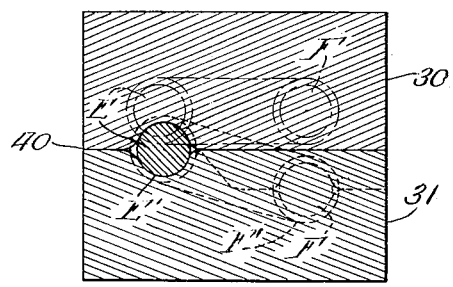
Fig. 8 is a section on the line 8—8 of Fig. 4.
Figure 9:
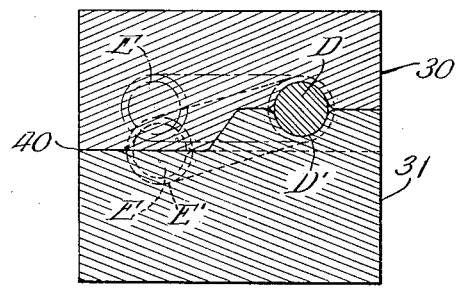
Fig. 9 is a section on the line 9—9 of Fig. 4.
Figure 10:
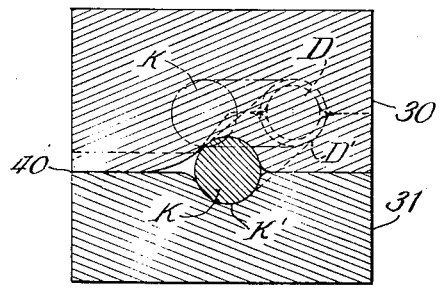
Fig. 10 is a section on the line 10—10 of Fig. 4.
Figure 4:
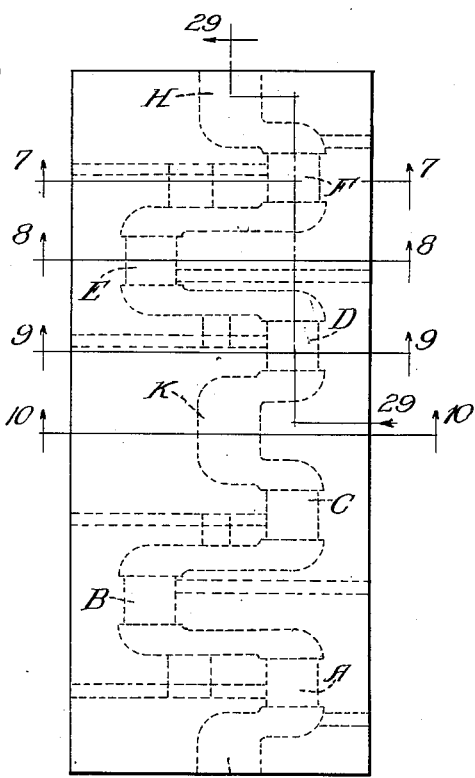
Fig. 4 is a plan view of the primary twisting dies.

The forging operation of which the present invention forms a part consists of a series of steps which are performed during a single heating of the blank and may be briefly described as follows. A bar of steel heated to the proper temperature is first bent by the usual forming dies to provide the arrangement of pins, bearings and crank arms or cheeks. The blank thus formed is presented to the final forming dies which shape the pins, cheeks and bearings. The blank is next presented to trimming dies to remove the flash and is then ready for the twisting operation. At this time the axes of the pins and bearings lie in the same plane.

The twisting of the pins to their proper position relative to each other and to the bearings is preferably performed in two steps which will be referred to as the preliminary twist and the final twist. At the completion of the final twist all pins and bearings should be in their proper relative position, but the pins are more or less oval in shape and the flash line is still present. The shaft is next rotated on its axis through an angle preferably of 90 degrees and in this position is struck by a pair of setting dies which perform no twisting operation but which re-form the pins, bearings and cheeks and at the same time entirely remove the flash line. At the completion of this step the pins and bearings should have their true cylindrical form. This last operation accomplishes also the important function of setting the metal, which not only increases the strength of the shaft but eliminates any tendency of the metal to spring back. The crank shaft may now be rotated to the position of the final twist and struck again by the final twisting dies. This shifting between the final twisting dies and the setting dies may be repeated as many times as desired, but it has been found in actual practice that a very accurate shaft has been produced at the completion of the first setting operation.

Referring to the drawings, the apparatus forming the selected embodiment of my invention is shown to comprise upper and lower preliminary twisting dies 30 and 31 respectively, which are mounted in the usual manner in the forging hammer and base. For convenience in operation, I have combined the final twisting and setting dies in the upper and lower blocks 32 and 33 respectively, though it will be readily evident that separate dies for each of these operations may be used.

The preliminary forming dies need no description, as dies for the purpose of forming offsets in a bar are in general use. The final forming dies are shown in Fig. 3 of the drawings, and the upper and lower dies are identical in form. The impression for the upper half of the shaft is provided in the upper die and for the lower half in the lower die. The shaft for which the present dies are designed is of the six-pin, three-bearing type. The pins are designated respectively A, B, C, D, E and F. The end bearings are designated respectively G and H and the center bearing is designated K. At the completion of the final forming operation the pins A, C, D and F are disposed in axial alignment with the common axis at 34 in Fig. 22 of the drawings. The three bearings G, H and K are likewise in alignment with their common axis at 35 in this figure. The pins B and E are likewise in axial alignment at 36. The pins A, B, and C correspond in position during all of the steps to the pins F, E and D respectively.

The blank at the completion of the final forming operation, as shown in Fig. 22, is placed upon the lower preliminary twisting die 31 in the position indicated in Fig. 29 and in dot and dash lines in Figs. 7 to 10 with the axes of all of the pins and bearings in a substantially horizontal plane. The depressions in the preliminary twisting dies to receive the pins A to F, the end bearings G and H, and the center bearing K are respectively designated A' to K'. The pins C and D are seated in their respective die cavities C' and D' and the end bearings G and H rest against the side wall of their respective cavities G' and H' when the blank is initially placed upon the lower preliminary twisting die. The other pins and bearings are unsupported. The final position of each of the pins and bearings is indicated in solid lines in Figs. 7 to 10 and the corresponding position of the next cheek and pin or bearing is indicated in dotted lines. The upper and lower dies meet on the parting line 40. Each of the preliminary twisting dies is provided with guide faces as at 31' to guide and support the moving cheeks during the twisting operation, and grooves as at 31'' are provided in each of these dies to receive the cheeks and true the same at the completion of this operation.

Figure 27:
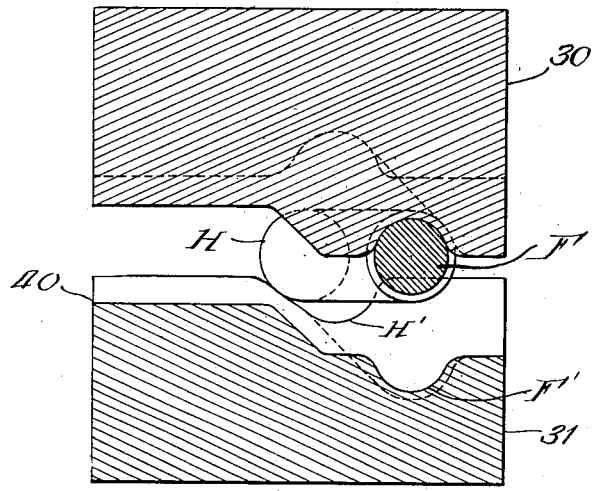
Fig. 27 is the same as Fig. 7 except that the parts are in the position of initial engagement by the upper die.
Figure 28:
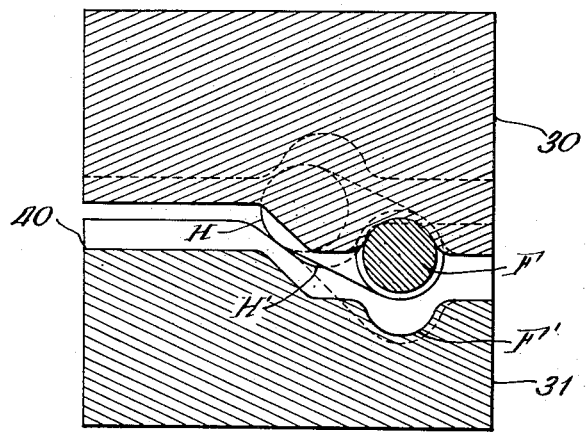
Fig. 28 is the same as Fig. 7 except that the parts are in a position intermediate Fig. 7 and Fig. 27.

In the preliminary twist the pins C and D remain seated in their respective die cavities C' and D' in the lower die but are rotated therein about their common axis. The pins A and F, having the farthest to move, are first engaged by the upper die. It happens that these pins seat themselves in their respective cavities or depressions in the upper die at the instant of engagement therewith, as illustrated in Fig. 27, but this is not true of any other pins or bearings except pins C and D which are not engaged by the upper die until the completion of the preliminary twisting operation. These pins A and F are moved straight down into their corresponding die cavities A' and F' in the lower die. This movement of the pins A and F causes the end bearings G and H to be drawn into their respective cavities G' and H' and the cheeks connecting them to be swung into the position indicated in dotted lines in Fig. 7. Fig. 27 illustrates the position of the parts at the instant of engagement of the upper die. Fig. 28 similarly illustrates the position of these parts when the operation has been partially completed.

Figure 11:
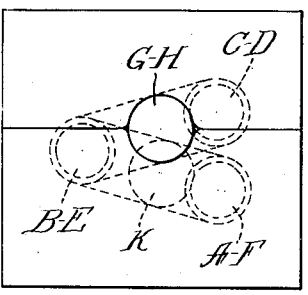
Fig. 11 is an end elevation of the primary twisting dies.
Figure 12:
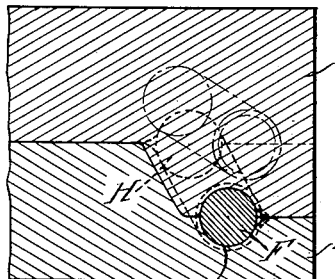
Fig. 12 is a section on the line 12—12 of Fig. 5.
Figure 5:
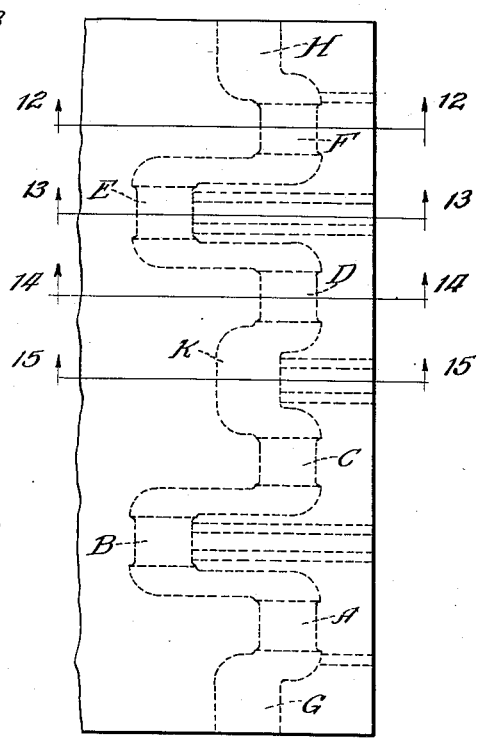
Fig. 5 is a plan view of the final twisting dies.
Figure 13:
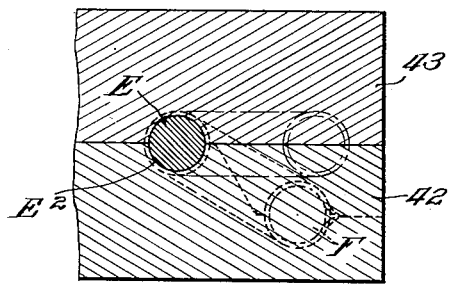
Fig. 13 is a section on the line 13—13 of Fig. 5.
Figure 14:
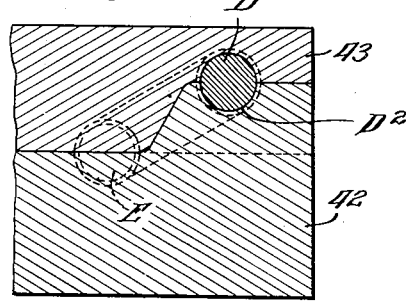
Fig. 14 is a section on the line 14—14 of Fig. 5.
Figure 16:
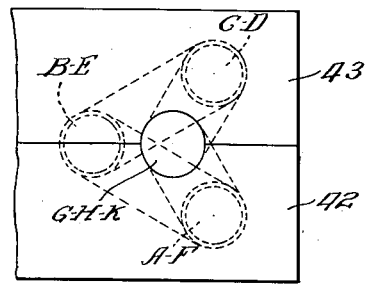
Fig. 16 is an end elevation of the final twisting dies.
Figure 15:
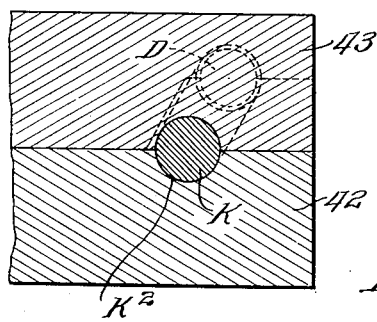
Fig. 15 is a section on the line 15—15 of Fig. 5.
Figure 17:
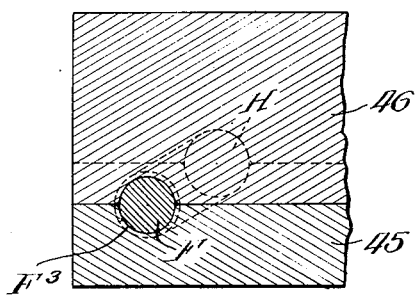
Fig. 17 is a section on the line 17—17 of Fig. 6.
Figure 6:
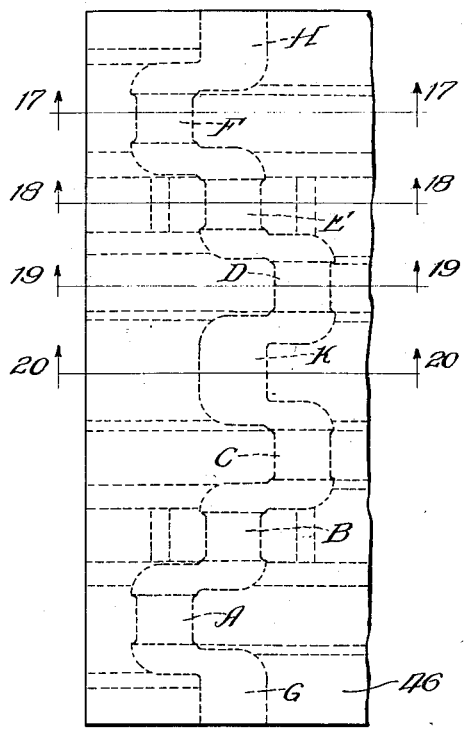
Fig. 6 is a plan view of the setting dies.
Figure 18:
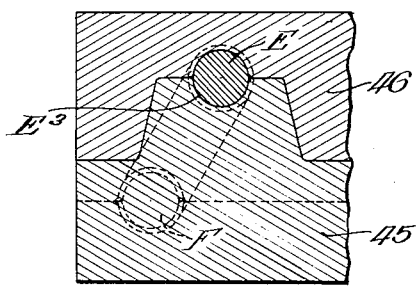
Fig. 18 is a section on the line 18—18 of Fig. 6.
Figure 19:
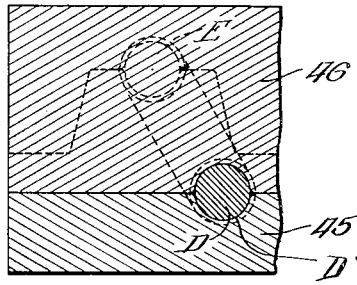
Fig. 19 is a section on the line 19—19 of Fig. 6.
Figure 21:
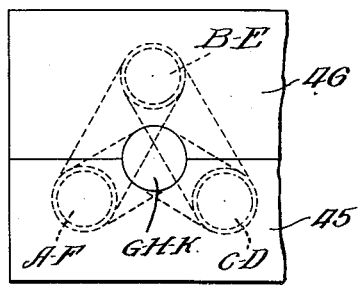
Fig. 21 is an end elevation of the setting dies.
Figure 20:
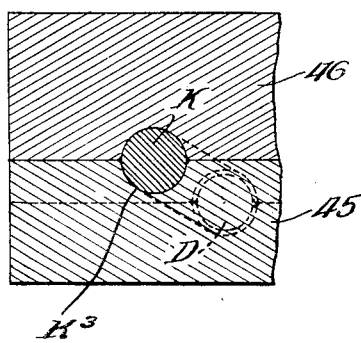
Fig. 20 is a section on the line 20—20 of Fig. 6.

The swinging movement of these cheeks is due to the inability of the end bearings to move downwardly with the pins A and F as these bearings are resting on the lower die, as has been described. The movement of the end bearings is a combined sliding and rotating one. Practically no torque takes place in the pins A and F in this operation. The center bearing K is engaged by the upper die next after the pins A and F. This bearing is not initially seated within the corresponding depression in the upper die as are the pins A and F but is engaged by the under face of the die and is caused thereby to swing in an arc of a circle with the common axis of the pins C and D as the center. As there is no appreciable compression, extension or distortion of the cheeks, the distance between centers of the pins C and D and the center bearing remains the same. The center bearing becomes seated in its die cavity K' at the completion of the operation. The pins B and E are the last to be engaged by the upper die, and these pins are swung downwardly in an arc of a circle about the common axis of the pins C and D in the same manner as the center bearing K. A torque takes place in the pins B, C, D and E. The disposition of the pins and bearings at the completion of the initial twisting operation is illustrated in Figs. 11 and 23. At this time all pins and bearings are in their final position with the exception of the pins A and F and the end bearings G and H. The entrance of the pins and bearings into their respective die cavities or depressions is facilitated by rounding the edges of these depressions, as shown in Figs. 7 to 10, although this is not necessary.

The crank shaft blank in its partially shaped condition is now removed from the preliminary twisting dies and placed on the lower final twisting die 42, in the position shown in Fig. 24, with the pins B, C, D and E and center bearing K seated respectively in the die cavities $B^2$, $C^2$, $D^2$, $E^2$ and $K^2$, leaving the pins A and F and the end bearings G and H free to move. When the upper die drops, the pins A and F are forced downwardly in an arc of a circle with the common axis of the pins B and E as the center of revolution as these latter pins are held in their respective die cavities. This movement is similar to that of the center bearing in the preliminary twisting operation. This swinging movement of the pins A and F causes the end bearings to be moved down into alignment with the center bearing. At the completion of this movement the pins A and F and the end bearings G and H are respectively seated in their cavities $A^2$, $F^2$, $G^2$ and $H^2$. Torque takes place in the pins B and E in this operation. As in the preliminary twisting operation, no appreciable compression, extension or distortion of the cheeks takes place in the final twisting operation. The distance between centers of each pin or bearing and its next adjacent pin or bearing is the same at the completion of this operation as at the completion of the forming operation. The cheeks in both the preliminary and final twisting operations act as rigid crank arms for the connected pins and bearing.

Upon the completion of the final twisting operation the crank shaft has excessive draft on the long cheeks and the pins are somewhat oval shaped, particularly pins B and E, because these have throughout the operations been struck on the same side and at practically the same angle. To true the pins, bearings and cheeks and remove the excessive draft, the crank shaft is now lifted from the final twisting die, where it was disposed in the position shown in Fig. 25, and placed upon the lower setting die 45 in the position shown in Fig. 26, with pins A to F, the end bearings G and H and the center bearing K respectively seated in the die cavities $A^3$, $B^3$, $C^3$, $D^3$, $E^3$, $F^3$, $G^3$, $H^3$ and $K^3$. The parts have been rotated through an angle of 90 degrees. The crank shaft is now struck in this position by the upper setting die 46. All pins and bearings and cheeks are supported by the lower die at the commencement of this operation so no twisting or distortion takes place.

The crank shaft may now be returned to the position from which it was removed from the final twisting dies and again struck by these dies. The shaft may then be returned to the setting dies and restruck, if this step is necessary.

It will readily be seen that with the present invention the twisting of the pins and bearings is accomplished by the conformation of the working faces of the dies and no twisting arms or wrenches need be used. The cheeks are guided and supported during the twisting operation and fit within the grooves provided for the purpose in the upper and lower dies in each of the steps, so that no distortion of these cheeks is possible. The striking of the pins by the dies in the manner described causes the spacing and centering of the pins to be absolutely accurate. The striking of the pins and bearings with setting dies at an angle to the blow in the final twisting die overcomes the oval shape of these pins and bearings and at the same time entirely eliminates the flash line. This flash line which has heretofore been left upon the pins and bearings at the completion of the forging has been exceedingly difficult to remove during the machining or grinding operation, as these crank shafts are made of very hard steel and frequently rupture of the tool or grinding wheel has resulted. The setting dies likewise remove the flash line from the cheeks and thus greatly facilitate machining, for the projection of this flash line has often been sufficient to interfere with the entrance of the grinding wheel between the cheeks. No appreciable stretching is produced by the twisting dies, so that absolute uniformity and balance of the parts is obtained.

By twisting the pins and bearings into their proper position rather than by the usual forging in position, it is possible to forge practically all designs of crank shafts, many of which could not be produced by the forging in position method.

The word "twisting" has been used in this application to describe the swinging movement of the pins, bearings and connecting cheeks and to differentiate from the usual bending or stretching movement of these parts occurring in the forging-in position method. The word "shaping" has similarly been used to indicate the moving of the throws into position as distinguished from the initial forming of the crank shaft with pins, bearings and cheeks.

The expression "forging in position" is a trade term used to describe the method of forging in which an article is both formed and shaped in a single operation. For example, in the forging of a crank shaft by this method the pins, bearings, and cheeks are simultaneously formed and brought into final position by the operation of forging dies acting upon a blank, as distinguished from the present method of completely forming the blank with pins, bearings and cheeks in one operation, and moving these parts into their final position in one or more subsequent operations.

The present operation is purely a forging process which may be accomplished by the usual hammers, and the dies are simple in construction. Likewise it is possible to use very light hammers in the twisting operation. It is unnecessary to provide the locks which are required by forging in position, for there is not the removal or displacement of metal which occurs in that operation. The particular design of the dies would naturally be varied for different types and designs of crank shafts but the process and its advantages would be the same in all cases.

What I claim is:

1. The improvement in the art of forging multi-throw crank shafts, which consists in twisting the throws to position by contacting the working faces of relatively movable rigid die members therewith.

2. The improvement in the art of forging the multi-throw crank shafts, which consists in forming the throws from a heated bar, and twisting the formed throws by contacting the working faces of relatively reciprocating rigid die members therewith.

3. The process of forging multi-throw crank shafts consisting in forming offsets in a heated bar, reducing the offset blank to substantially the desired contour with all throws substantially in the same plane, and twisting said throws into different planes by subjecting portions of the formed blank to contact with the opposing faces of relatively movable rigid forging dies.

4. The process of forging multi-throw crank shafts which consists in forming a heated blank in substantially the desired contour with all throws in the same plane, and twisting some of the throws and then the remaining throws to position by successively contacting two sets of working faces of relatively movable die members with the formed blank.

5. The process of forging multi-throw crank shafts which consists in forming a heated blank in substantially the desired contour with all throws in the same plane, twisting some of the throws and then the remaining throws to position by successively contacting two sets of working faces of relatively movable die members with the formed blank, and setting the shaped blank.

6. The process of forging multi-throw crank shafts, consisting in shaping a blank between forging dies, rotating the shaped blank about its axis through an angle from its final position in the shaping dies, and submitting the same in its new position to setting dies.

7. The process of forging multi-throw crank shafts, consisting in forming a blank, shaping the blank between forging dies, and submitting the shaped blank to truing dies with the blank rotated on its axis through an angle of 90 degrees from its position at the completion of the shaping operation.

8. The process of forging multi-throw crank shafts, consisting in forming and shaping a blank between forging dies, and subjecting the shaped blank to the action of setting dies directed substantially at right angles to the application of pressure in the forming and shaping thereof.

9. The process of forging multi-throw crank shafts, consisting in forming the blank, shaping a formed blank by die forging, and subjecting the shaped blank to setting dies having their meeting faces disposed relative to the blank at a right angle to the position of the meeting faces of the shaping dies.

10. The process of forging multi-throw crank shafts, consisting in forming a blank by forging, moving the formed throws into different positions, and subjecting the blank to pressure directed at an angle to the direction of pressure in said moving operation.

11. The process of forging multi-throw crank shafts, consisting in forming a blank by forging, twisting the throws into different positions, and subjecting the blank after the completion of the twisting operation to pressure directed at an angle to the direction of pressure in the twisting operation.

12. The process of forging multi-throw crank shafts, consisting in forming a blank by forging, twisting the throws into different positions, subjecting the blank after the completion of the twisting operation to pressure directed at an angle to the direction of pressure in the twisting operation, and then subjecting the blank to pressure in substantially the same direction as in the twisting operation.

13. The process of forging multi-throw crank shafts, consisting in forming a blank by forging, twisting certain throws by one set of forging dies, completing the twisting of the throws by another set of forging dies, subjecting the blank to setting dies exerting a pressure thereon at substantially a right angle to the direction of pressure in the final twisting operation, and then resubmitting the blank to the final twisting dies.

14. The process of forging multi-throw crank shafts, consisting in forming a blank by forging, twisting certain throws by one set of forging dies, completing the twisting of the throws by another set of forging dies, subjecting the blank to setting dies exerting pressure thereon at substantially a right angle to the direction of pressure in the final twisting operation, and alternately submitting said blank thereafter to the setting dies and the final twisting dies.

15. The process of forging multi-throw crank shafts, consisting in forming a blank and then twisting the throws into position with the cheeks supported and guided during the twisting operation.

16. The process of forging multi-throw crank shafts, consisting in forming a blank, twisting the throws into position with the cheeks supported and guided during the twisting operation, and shaping and truing the cheeks at the completion of the twisting operation.

17. Apparatus for the manufacture of multi-throw crank shafts, comprising relatively movable die members having working faces forming a die cavity corresponding substantially in contour to the shaped blank at the end of the operation effected thereby, and guide faces for effecting the twisting of a formed blank placed therebetween during the relative movement of said members.

18. Apparatus for the manufacture of multi-throw crank shafts, comprising a fixed lower die having projections and depressions formed on the working face thereof to support certain portions of a formed blank resting on said face, and to leave certain other portions thereof unsupported, and a movable upper die having depressions and projections formed on the working face thereof disposed opposite to the corresponding projections and depressions on said lower die, the projections on said upper die being adapted to engage the unsupported portions of said blank to twist said portions into angular relation with the supported portions thereof during the downward movement of said upper die.

19. Apparatus for the manufacture of multi-throw crank shafts, comprising a fixed lower die having projections and depressions formed on the working face thereof to support certain pins and bearings of a formed blank resting on said face and to leave certain other pins and bearings of said blank unsupported, a movable upper die having depressions and projections formed on the working face thereof corresponding to the opposing projections and depressions on said lower die, the projections on said upper die being adapted to engage the unsupported pins and bearings of said blank and twist the same into a different relative position to the supported pins and bearings of said blank during the downward movement of said upper die, and guide faces formed on said dies to guide and support the cheeks of said blank during the twisting operation.

20. Apparatus for the manufacture of multi-throw crank shafts, comprising relatively movable die members having opposing working faces of irregular contour, said working faces being adapted to contact with the pins and bearings of a formed blank placed therebetween to hold certain of said pins and bearings and to revolve certain other pins and bearings on the held parts as centers during the relative movement of said members, guide faces on said dies to guide and support the moving cheeks of said blank during the twisting operation, and oppositely disposed grooves in said faces to receive and shape said cheeks at the completion of said twisting operation.

21. The process of forging multi-throw crank shafts, consisting in forming the blank, shaping the blank between twisting dies, and reforging the shaped blank to true and shape the pins, bearings and cheeks, remove excessive draft, and eliminate distortion of the parts.

22. The process of forging multi-throw crank shafts, consisting in forming the blank, twisting the throws into position, and then reforging the twisted blank to true and shape the pins, bearings and cheeks, remove excessive draft, and eliminate distortion of the parts.

23. The process of forming multi-throw crank shafts, consisting in forming the blank with all pins and bearings in the same plane, moving certain pins and bearings into their final position, and then moving the bearings which are not in their final position into axial alignment with the positioned bearings.

24. The process of forging multi-throw crank shafts, consisting in forming a blank by forging, twisting the throws into different positions by contacting the working faces of relatively movable rigid die members therewith, and subjecting the blank after the completion of the twisting operation to pressure directed at a right angle to the direction of pressure in the twisting operation.

ALBERT J. LARCHER.